United States Patent [19]

Bramwell et al.

[11] Patent Number: 4,529,155
[45] Date of Patent: Jul. 16, 1985

[54] REDUNDANT TAIL ROTOR CONTROL SYSTEM

[75] Inventors: Frank Bramwell, Hamden; Roderick A. MacLennan, Stratford, both of Conn.

[73] Assignee: United Technologies Corporation, Hartford, Conn.

[21] Appl. No.: 559,994

[22] Filed: Dec. 9, 1983

[51] Int. Cl.³ .............................................. B64C 13/30
[52] U.S. Cl. ............................... 244/232; 74/501.5 R; 244/17.21
[58] Field of Search ............... 244/17.19, 17.21, 221, 244/232, 233; 74/469, 470, 501 R, 501.5 R, 96

[56] References Cited

U.S. PATENT DOCUMENTS

| | | | |
|---|---|---|---|
| 2,841,030 | 7/1958 | Wrighton | 74/501.5 R |
| 2,992,568 | 7/1961 | Benkovsky | 74/501.5 R |
| 3,277,738 | 10/1966 | Glauser et al. | 74/501.5 R |
| 3,599,507 | 8/1971 | Exton | 74/469 |
| 4,170,147 | 10/1979 | Durno et al. | 244/232 |
| 4,198,877 | 4/1980 | Huling | 74/501.5 R |

Primary Examiner—Galen L. Barefoot
Attorney, Agent, or Firm—Russell M. Lipes, Jr.

[57] ABSTRACT

A flight control system for a helicopter tail rotor having a semicircular quadrant 18 with bell cranks 36, 40 mounted on either end of the quadrant and flexible control cables 20, 22 connected to each bell crank. The bell cranks are spring loaded in opposition to cable tension, and a fixed abutment 72 provides a reaction against the bell crank springs in the event of a cable severance. The quadrant works against the spring loading of one bell crank in the event of breakage of the opposite control cable and is centered by the spring loading of both bell cranks if both cables are broken.

9 Claims, 4 Drawing Figures

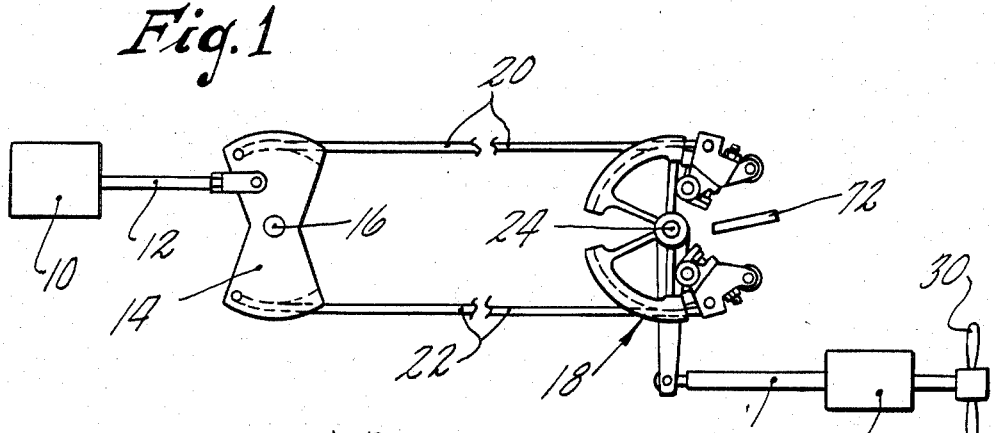
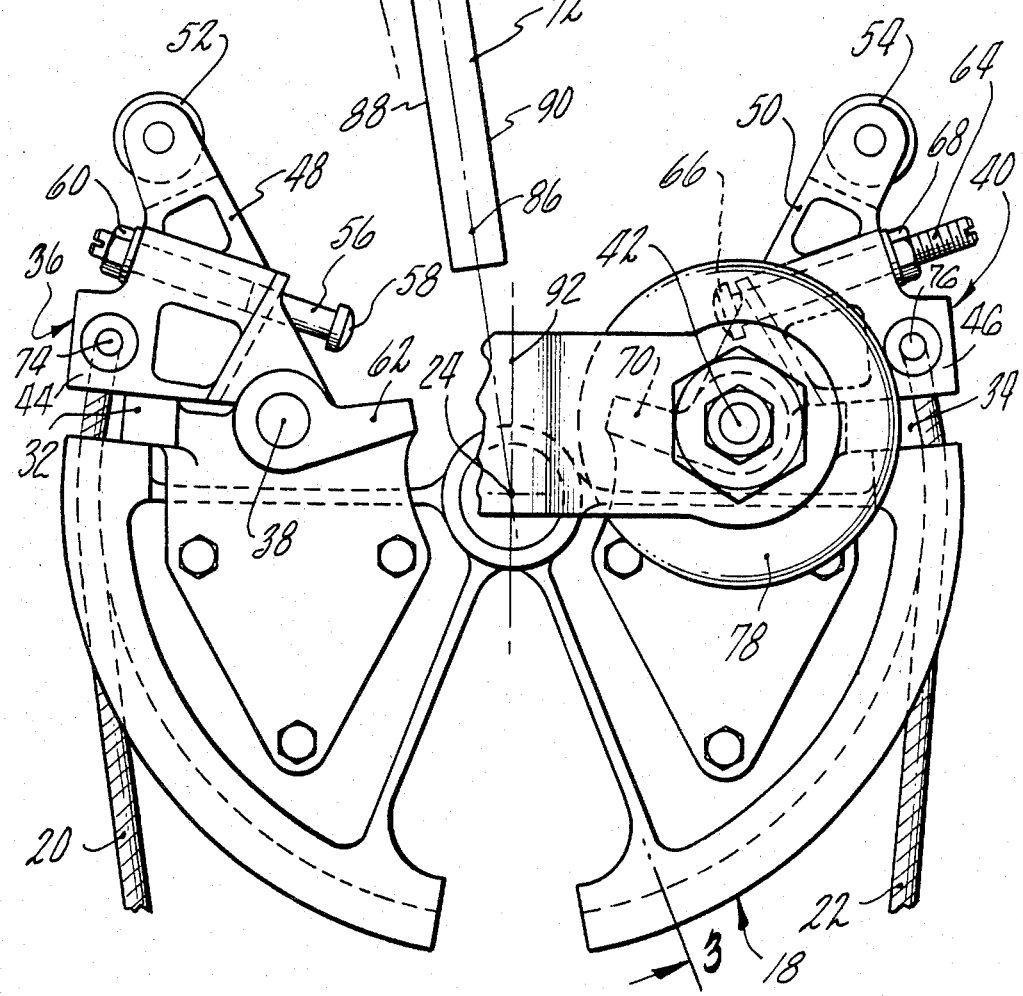

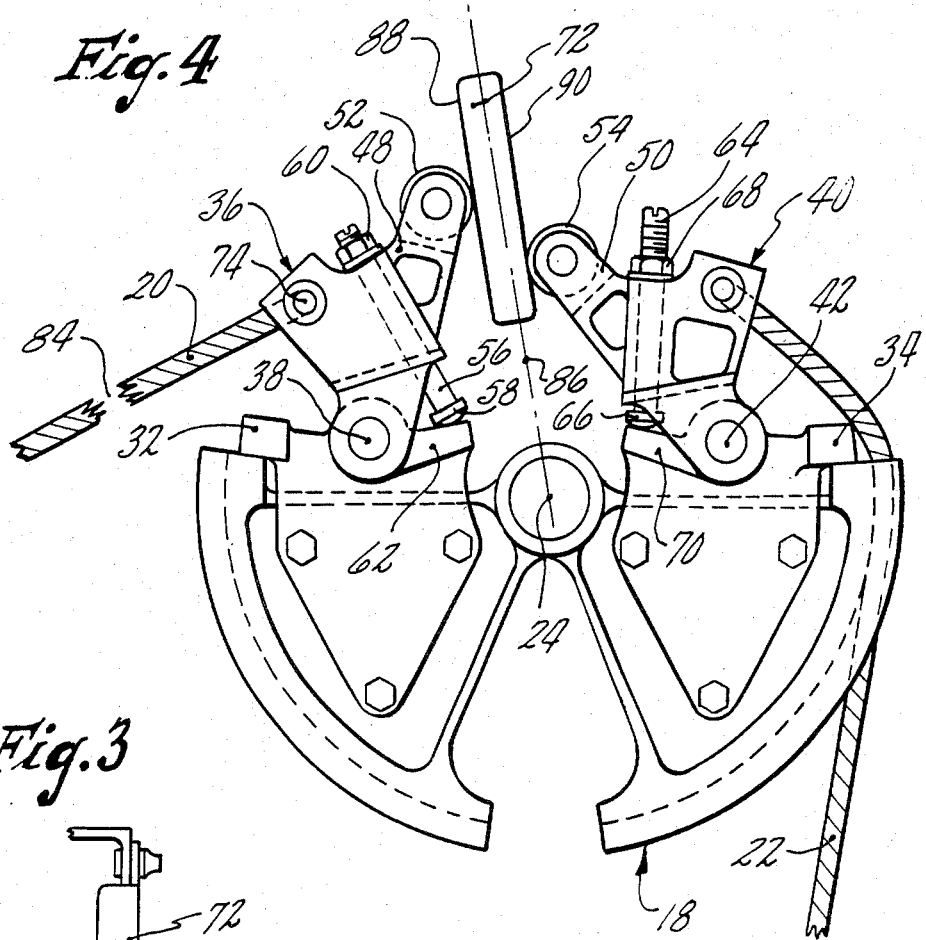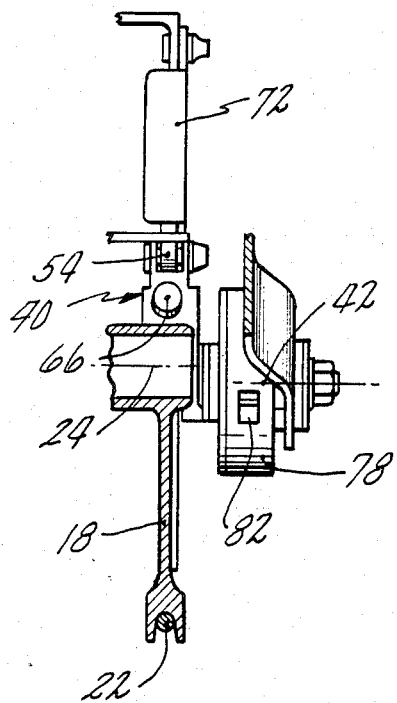

REDUNDANT TAIL ROTOR CONTROL SYSTEM

DESCRIPTION

1. Technical Field

This invention relates to a helicopter flight control system for the tail rotor which ensures that the helicopter will be in a controllable state even though directional control has been impaired or lost.

2. Background Art

Previous designs of flight control systems to provide control of the tail rotor of a helicopter after a flexible control cable has been severed or broken have in most instances been directed to systems employing a servo boost unit which isolates the helicopter pilot from flight and other loads imposed upon the system. In medium and smaller helicopters where both weight and cost factors preclude the use of specific servo boost units, care must be taken to keep to a minimum the loads which the pilot feels through foot and hand controls. This is important particularly with regard to pilot fatigue as well as control sensitivity. Back-up systems for primary tail rotor control systems do in some instances employ a centering spring which applies a load to the yaw controls. In modern helicopters, employing collective yaw coupling, to relieve the pilot from having to input yaw pedal correction with every collective stick input, the tail rotor centering spring from prior art introduces undesirable feedback forces into the pilot's collective stick, that is not acceptable to pilots.

In the redundant flight control system described in U.S. Pat. No. 4,186,622, the loading of the bungee springs is such that despite the mechanical advantage provided by the mixing unit, in the absence of a boost servo actuator, the pilot's feet would be subject to varying loads as the quadrant is rotated. Similarly, in U.S. Pat. No. 4,170,147 the arrangement is such that, in the absence of a boost servo actuator, the loading would be increased on one foot or the other as the control quadrant is actuated.

DISCLOSURE OF INVENTION

An object of the invention is the provision of a helicopter tail rotor flight control system having a quadrant construction that prior to the event of control cable disablement will not load the control system, and following such a disablement will enable a centering action, and control in one direction from center.

Another object of the invention is to provide in a helicopter tail rotor flight control system a control quadrant centering function which is active only in the event of severance or breakage of one of the flexible control cables, and will provide limited control of the yaw control after such severance.

The foregoing and other objects, features and advantages will be apparent from the specification and claims and from the accompanying drawings which illustrate an embodiment of the invention.

BRIEF DESCRIPTION OF THE DRAWINGS

FIG. 1 is a schematic showing of a helicopter tail rotor flight control system in which the invention would be used.

FIG. 2 is an enlarged showing of a portion of the FIG. 1 system showing details of the control system quadrant construction with the quadrant in a neutral position.

FIG. 3 is a section through a portion of a quadrant along line 3—3 in FIG. 2.

FIG. 4 is a showing of the quadrant after failure of one of the control cables.

BEST MODE FOR CARRYING OUT THE INVENTION

In the schematic showing of FIG. 1, pilot actuated foot pedals 10 through linkage 12 directly actuate member 14 which rotates about axis 16 in response to pedal pressure. There is no pilot boost unit connected to the foot pedals as is commonly used, particularly on larger helicopters. Member 14 is connected to control quadrant 18 by flexible cables 20 and 22 to rotate the quadrant about axis 24 in either a clockwise or counterclockwise direction. Quadrant 18 is connected by link 26 to tail rotor servo 28 which varies the pitch of helicopter tail rotor 30 to control the yaw moment imposed upon the helicopter.

FIG. 2 shows details of quadrant 18, the quadrant being in a neutral operating position. The quadrant is essentially semi-circular in form and has on either side of its rotational axis and at its ends abutments 32 and 34. Between abutment 32 and rotational axis 24 bell crank 36 is attached to the quadrant so as to be pivotable about connection 38. Similarly, between abutment 34 and rotational axis 24 bell crank 40 is attached to the quadrant so as to be pivotable about connection 42. The bell cranks are essentially the same in construction. Each has an arm 44, 46 adapted to contact one of the bell crank abutments 32 or 34, each has an arm 48, 50 carrying a roller 52, 54, and each is spring loaded away from contact with its abutment. There is an adjustable stop bolt through each bell crank between the arms. Bolt 56 in bell crank 36 has head 58 and locking nut 60, and the adjusted position of the bolt through contact of head 58 with shoulder 62 on quadrant 18 limits clockwise rotation of bell crank 36. Bolt 64 in bell crank 40 has head 66 and locking nut 68, and the adjusted position of the bolt through contact of head 66 with shoulder 70 on quadrant 18 limits counterclockwise rotation of bell crank 40. The stop bolts provide adjustment of the position at which the quadrant will center, and a firm stop function to produce a sharply detented spring force to displacement relationship. Abutment 72 fixedly attached to the airframe, through contact by roller 52 on bell crank 36 limits clockwise rotation of quadrant 18, and through contact by roller 54 on bell crank 40 provides a reaction against bell crank spring force in the event of cable severance. Abutment 72 is passive during normal operation of the control system.

Bell crank 36 is connected to cable 20 by means of cable end fitting 74 in arm 44. During normal operation of the helicopter, cable tension maintains bell crank 36 in its extreme counterclockwise position with arm 44 against abutment 32 and against the force of a spiral spring which is part of pivotable connection 38. Spring force would move bell crank 36 in a clockwise direction if not resisted, as by cable loading. Cable 22 is connected to bell crank 40 by means of fitting 76 in arm 46. Cable tension maintains bell crank 40 in its extreme clockwise position with arm 46 against abutment 34 and against the force of a spiral spring which is part of pivotable connection 42. Spring force would move bell crank 40 in a counterclockwise direction if not resisted, as by cable loading.

FIG. 3 is a section along line 3—3 in FIG. 2 through quadrant 18 showing its rotational axis 24, bell crank 40 with its roller 54, bolt head 66 and associated spring case 78, all of which rotate about bell crank pivotable connection 42. The inner end of the spring within the case is fixed with respect to bell crank 40 and the outer end 82 of the spring is connected to case 78. The spring for bell crank 40 is torqued so as to tend to rotate the bell crank in a counterclockwise direction. The spring for bell crank 36 is torqued so as to tend to rotate the bell crank in a clockwise direction.

FIG. 4 shows the result during operation of failure or severance of one of the control cables, cable 20 which is broken at 84. Upon cable failure, bell crank 36 would rotate in response to its unbalanced spring loading and the quadrant will then be spring loaded against the remaining cable, but will be free to rotate through its normal full travel. Bell crank 40 would also rotate upon loss of tension in one cable since this will result in loss of tension in the other cable. Both bell cranks will rotate until rollers 52 and 54 contact abutment 72, and then the quadrant will rotate until bolt heads 58 and 66 come into contact with abutments 62 and 70, respectively. This establishes a quadrant position that matches the predetermined self-centering position. Thus, limited directional control can be maintained through the still intact cable 22 working against the force of the spring loading on bell crank 36.

If cable 22 was also broken, the action would be identical to the action previously described and the quadrant would self-center to the preselected position. However, with both cables severed, any further limited control of the tail rotor would be lost. Since the springs are configured to be of equal rate and preload and positive detent action is provided by the stop bolts, a position would be established of quadrant 18 centered with respect to the radial line axis 86 of abutment 72 with the spring forces taken out through the stop bolts. This would, however, assure a stable flight condition, even though directional control capability of the helicopter has been lost. Loads on the tail rotor which tend to change pitch would be resisted by tail rotor servo 28 and the servo would be locked at a centered position by the centering spring forces applied to the servo input. Each stop bolt 56, 64 locks out the spring in its associated bell crank allowing the other spring to operate through the bell crank roller 52, 54 and ramp 88 or 90, FIG. 2, on abutment 72 to center the quadrant without having to fight the first spring.

While abutment 72 normally would be aligned with the neutral vertical axis 92 of quadrant rotational axis 24, it may be located to either side of the vertical axis to provide a predetermined tail rotor blade pitch upon failure of cable or cables 20 and 22 where the quadrant is under the influence of the bell crank springs. As shown, the abutment is located slightly to the left of the vertical axis.

It should be understood that the invention is not limited to the particular embodiment shown and described herein, but that various changes and modifications may be made without departing from the spirit and scope of this concept as defined by the following claims.

I claim:

1. In a flight control system for the tail rotor of a helicopter, a partially circular member rotating about a center axis and having flexible cables for rotating said member about said axis attached thereto, said member having abutments defined at either end of its circular form, bell crank means mounted for rotation on said member on either side of said center axis and between said axis and said abutments, each bell crank having an arm for contacting a member abutment, a roller and a stop bolt for contacting a stop shoulder on said member, an abutment fixed to the structure of said helicopter for contact by said bell crank rollers to limit rotation of said member about said center axis, one of said flexible cables being connected to each of said bell cranks and spring means for each bell crank, said spring means tending to rotate said bell cranks in opposition to tension in said cables.

2. A flight control system for the tail rotor of a helicopter in accordance with claim 1 in which the flexible cables are connected to the arms of said bell crank.

3. A flight control system for the tail rotor of a helicopter in accordance with claim 1 in which the bell crank spring means is a spiral spring.

4. A flight control system for the tail rotor of a helicopter in accordance with claim 1 in which the fixed abutment is located so as to provide a bias to tail rotor control.

5. A flight control system for the tail rotor of a helicopter in accordance with claim 1 in which the fixed abutment has two sides on which said bell crank rollers can roll.

6. A flight control system for the tail rotor of a helicopter in accordance with claim 1 in which the stop bolts are capable of position adjustment, and provide a detented centering spring function.

7. A flight control system for the tail rotor of a helicopter in accordance with claim 1 in which the partially circular member is substantially semicircular in shape.

8. A flight control system for the tail rotor of a helicopter in accordance with claim 1 in which a bell crank arm extends in one radial direction from the rotational axis of the bell crank and the roller is located on an arm extending in another radial direction from the rotational axis of the bell crank.

9. A flight control system for the tail rotor of a helicopter in accordance with claim 1 in which said stop bolts and stop shoulders are located so as to limit rotation of said bell cranks in response to the loading of said spring means.

* * * * *